United States Patent Office 3,047,521
Patented July 31, 1962

3,047,521
METHOD OF MAKING IMPROVED POLYMERIC DIHYDROQUINOLINE COMPOSITIONS
Carl A. Harman, St. Albans, W. Va., assignor to Monsanto Chemical Company, St. Louis, Mo., a corporation of Delaware
No Drawing. Filed Aug. 13, 1959, Ser. No. 833,395
6 Claims. (Cl. 260—23)

The present invention relates to a method of making improved antioxidant compositions and more particularly to a method of making an improved form of polymeric dihydro-2,2,4-trimethylquinoline, especially for use as a rubber antioxidant.

Early in the rubber art investigators discovered that dihydro-2,2,4-trimethylquinoline protected rubber from aging. However, this antioxidant never achieved acceptance because of its high volatility and intense staining of light colored rubber compositions, and articles in contact with rubber containing it. On the other hand, polymeric forms have enjoyed wide commercial acceptance. A method of obtaining a polymeric form by heating dihydro-2,2,4-trimethylquinoline with a strong non-oxidizing mineral acid was described by Ingram, U.S. Patent 2,064,752, December 15, 1936. This converted the liquid monomer into a solid of melting range 100–118° C. An improvement in the polymerization process was described by Harris, U.S. Patent 2,718,517, September 20, 1955. Hydrochloric or sulfuric acid was added to convert at least 75% of the monomer to its salt and then heating was continued in the presence of sufficient water to maintain a homogeneous liquid throughout the polymerization reaction. This procedure significantly raised the initial softening point of the polymer. The patent records a melting range of 106–114° C.

On the other hand, these improvements introduced new problems. For proper dispersion into the rubber it was necessary to reduce the solid polymer to finely divided form. The fine powder is very dusty, possesses high static charge and stains the skin and clothing of workmen coming into contact with it. In short, the finely divided polymer is very disagreeable to use. Various techniques for converting high melting rubber compounding ingredients into agglomerated forms have been discovered during the past decade but these techniques proved to be singularly unsuccessful when applied to polymeric dihydro-2,2,4-trimethylquinoline. Such agglomerating aids as stearic acid, polybutene or rubber latex has enabled manufacturers to convert a variety of rubber compounding ingredients into dispersible agglomerates but similar treatment of the polymeric quinoline failed to produce a dispersible product with acceptable handling and storage characteristics, particularly as regards dusting and build-up of static electricity.

A method has now been discovered whereby the static character of the product can be alleviated and non-dusty agglomerated forms produced if desired which, nevertheless, disperse readily into rubber. These results are accomplished very simply by fusing the polymeric dihydro-2,2,4-trimethylquinoline with a melting point depressant. The agents suitable for this purpose include agglomerating and dispersing aids used in prior methods but surface coating of the particles will not suffice. In other words, the mere presence of a potential melting point depressant is of no avail. The polymer must be fused with the auxiliary agent prior to incorporating it into the rubber. Thus, the new process comprises the steps of mixing polymeric dihydro-2,2,4-trimethylquinoline with a potential melting point depressant, heating the mixture to homogeneous molten condition, cooling and subdividing the fused mixture into discrete, free-flowing particles. It is generally undesirable to add more than 15% of a melting point depressant as greater amounts dilute the antioxidant excessively and may reduce the softening point so low that sticking occurs during storage.

Satisfactory results have been obtained with melting point depressants in amounts of 3–15% of the dihydroquinoline, the preferred range being 5–10% or sufficient to provide an initial softening point within the range of about 65–85° C. Amounts below 5% are often insufficient to provide adequate dispersing characteristics. An initial softening point below about 65° C. renders storage stability questionable but softening at least as low as 85° C. is desirable for satisfactory incorporation of large particles into rubber. This assures adequate dispersion under most conditions encountered in industry. The size of the particles ultimately produced is then largely a matter of convenience and preference. Within wide limits the size of the particle is no longer a function of dispersion.

The process will be readily understandable from the following typical example: 100 parts by weight of regular production, finely divided polymeric dihydro-2,2,4-trimethylquinoline having a melting range of about 105–125° C. made by the Harris process, was heated to a molten condition and thereto was added 11 parts by weight of a molten (60° C.) blend of equal parts of polyethylene glycol, molecular weight about 600, and rubber grade stearic acid. The mixture was heated and stirred to a final temperature of 150° C. and then converted into coarse particles or flakes. One procedure was to immerse a cold metal sheet in the molten bath for several seconds, remove the metal with adherent thin coat of the antioxidant composition, cool and chip off in flake form. Another procedure was to pour the product on a cooled surface and chip from the surface after the product had hardened. A third procedure was that known in the industry as "prilling." The molten blend was poured into rapidly agitated water at 50° C. and the spheres or "prills" separated by filtering from solution and dried at 60° C. The spheres were normally greater than 20-mesh in size.

The method of mixing the melting point depressant with the antioxidant may vary widely. The antioxidant exhibits very poor heat transfer and is difficult to melt. For this reason, it is convenient to dissolve it in a solvent and then with removal of the solvent, simultaneously convert to a molten state followed by mixing with the melting point depressant. Furthermore, this procedure effects certain economies in the manufacture. Polymerization carried out in dilute aqueous hydrochloric acid, according to the Harris procedure, normally includes the steps of neutralizing the acid solution, heating to increase particle size enough for convenient filtering, centrifuging, washing, drying and milling. All of these steps may be eliminated and substituted by simultaneous neutralization and extraction with water immiscible solvent, preferably xylene, separation of the aqueous mother liquor, stripping of solvent by distillation, blending in the melting point depressant and flaking, casting or prilling to give the desired product form. The solidified product may be milled to finely divided form if this is required. The steps result in a lighter colored product than heretofore available.

As illustrative of the use of an organic solvent, 370 parts by weight of the mixture of polymeric dihydro-2,2,4-trimethylquinoline and hydrochloric acid prepared by the Harris process, which contained approximately 48.9% by weight polymer, was charged to a glass or glass-lined reactor equipped with a stirrer, thermometer, reflux condenser, bottom drain line and heating jacket. To the reactor was added 326 parts by weight of water and 179 parts by weight of xylene. The mixture was stirred and to it added 81 parts by weight of 30% ammonium hydroxide, keeping the temperature of the reaction mixture at 55–60° C. The ammonium hydroxide was added over a period of about 15 minutes at which time the pH of the slurry was approximately 8. Stirring was continued for about 10 minutes more, the mixture allowed to separate into layers and the lower aqueous layer of 570 parts by weight drawn off. The organic layer was washed with water by adding 116 parts by weight of water at 60° C., stirring about 10 minutes, settling for 15 minutes and drawing off the water layer. The mixture was then transferred to a distillation vessel and the solvent removed by distillation. The water remaining in the xylene was removed as xylene-water azeotrope. The distillation was carried out from an initial pot temperature of 97° C. to a final pot temperature of 160° C. Vacuum (24″ mercury) was then applied and residual xylene distilled off by heating to a pot temperature of 165° C. To the molten residue was added 18 parts by weight of a molten blend of equal parts of polyethylene glycol, molecular weight 600, and rubber grade stearic acid. The ingredients were heated and stirred thoroughly at 150° C. and molten product cast onto a stainless steel surface to harden. After hardening, the product was scraped from the surface in flake form. The flaked product melted at 67–88° C. whereas a sample isolated from the same polymerization batch without additive and converted to conventional powdered form melted at 95–124° C. Flakes of the cast product dispersed satisfactorily in rubber.

Conventional equipment can be used to agglomerate the fused mixture. The molten product may be cast onto the cooled belt of a conveyer or cast onto a conventional drum type flaker. The antioxidant and non-staining properties of the product are retained regardless of the method of agglomeration or, for that matter, regardless of whether the product is in finely divided or agglomerated form. Acid polymerized dihydro-2,2,4-trimethylquinoline prevents the phenomenon known as "frosting." Especially in natural rubber stocks cured in dry heat a bloom often develops resulting in a dull unsightly surface. Also in molded goods where considerable flow of the stocks takes place during cure, frosting is often a problem. The products produced by the process of this invention retain the antifrosting properties of the parent antioxidant. The added ingredient does not interfere with the anti-frosting properties.

The particular ingredient added is largely a matter of indifference. As illustrative of the effect of stearic acid on the melting point, the aforementioned powdered product melting at 95–124° C. was fused with different amounts of stearic acid and the melting range of the mixtures recorded.

Percent stearic acid:            Melting range, ° C.
     5 ---------------------------------------- 78–103
     7½ --------------------------------------- 76–90
     10 --------------------------------------- 67–80

All of these compositions were equivalent in dispersing properties. However, flakes of the composition containing 10% stearic acid were noticeably superior with respect to the absence of dustiness and static charge. Where mixtures of melting point depressants are employed, it makes no difference in the final result whether they are premixed before addition or added separately. While not all substances are compatible with the antioxidant, an example being polyvinyl chloride, the material selected as melting point depressant may be any one of a large number of available materials.

As illustrative of melting point depressants and results to be obtained, powdered polymeric dihydro-2,2,4-trimethylquinoline, which melted at 98–120° C., was fused with the melting point depressants in the amount indicated below and the melting range determined. Dispersion information was also obtained on some of the products and is recorded under "Remarks." For evaluating dispersion the antioxidant composition was added to a rubber base to produce a mixture comprising Parts by weight
Smoked sheets ------------------------------- 176
Titanium dioxide ----------------------------- 24
Antioxidant composition ---------------------- 15–25

The rubber and titanium dioxide were mixed on a 6″ × 12″ rubber mill at 70° C. setting 0.030″. The antioxidant composition was added and blended by the following schedule:

| Time in Minutes | Procedure |
| --- | --- |
| 0 | Add base to mill. |
| 1 | Add antioxidant. |
| 3½ | Blend by ¾ cuts alternately at 10-second intervals. |
| 4½ | Roll stock and pass through 9 times endwise. Sheet out at 0.060″ and appraise dispersion. |

The principal qualities used in appraising overall suitability of dispersion and handling were incidence of flying particles during addition, dustiness, static charge, rate of incorporation, smearing on the mill rolls and appearance of finished masterbatch, noting particularly graininess, gloss and color.

| Melting Point Depressant | Percent of Antioxidant | Melting Range, °C. | Remarks |
| --- | --- | --- | --- |
| None | none | 96–118 | Poor dispersion. |
| Stearic acid | 5 | 84–87 | Good dispersion. |
| Do | 10 | 66–93 | Excellent dispersion. |
| Polyethylene | 10 | 85–115 | Fair dispersion. |
| Polybutene (M.W.=300–400) | 10 | 79–100 | Acceptable dispersion. |
| Dihydro-6-ethoxy-2,2,4-trimethylquinoline | 25 | 62–80 | Do. |
| Dihydro-2,2,4-trimethylquinoline | 10 | 76–86 | Do. |
| Ethylene glycol monostearate | 4 | 93–111 | Poor dispersion. |
| Do | 10 | 68–92 | |
| n-Butyl stearate | 4 | 87–106 | Fair dispersion. |
| Methyl stearate | 4 | 84–108 | |
| Ethyl stearate | 4 | 81–104 | |
| Do | 10 | 69–91 | |
| Glycerol monostearate | 4 | 85–110 | |
| Phenyl stearate | 4 | 86–110 | |
| Do | 10 | 72–89 | |
| Propylene glycol monooleate | 4 | 86–109 | |
| Butyl oleate | 4 | 82–104 | |
| Polyethylene glycol (M.W.=300) + stearic acid (equal parts). | 10 | 72–85 | Very good dispersion. |
| Polyethylene glycol (M.W.=600) + stearic acid (equal parts). | 4 | 78–97 | |
| | 10 | 73–87 | Do. |
| Polyethylene glycol (M.W.=1,000) + stearic acid (equal parts). | 4 | 80–102 | |
| Polyethylene glycol (M.W.=1,540) + stearic acid (equal parts). | 4 | 79–103 | |
| Polyethylene glycol (M.W.=600) + saturated fatty acids (equal parts). | 10 | 62–80 | Good dispersion. |
| Polyethylene glycol (M.W.=600) + crude fatty acids (equal parts). | 10 | 68–90 | Do. |
| Polyethylene glycol (M.W.=300). | 10 | 72–85 | |
| Polyethylene glycol (M.W.=600). | 10 | 78–89 | |
| Polyethylene glycol (M.W.=600) + distilled tall oil (equal parts). | 10 | 67–80 | Acceptable dispersion |
| Polybutylene (M.W.=300–400) + stearic acid (equal parts). | 10 | 72–88 | |
| Polypropylene glycol (M.W.=400) + stearic acid (equal parts). | 10 | 68–92 | |
| Polyethylene glycol (M.W.=400) monostearate. | 4 | 90–113 | Poor dispersion. |
| Do | 10 | 58–79 | |
| Polyethylene glycol (M.W.=400) monooleate. | 4 | 90–109 | Do. |
| Do | 10 | 62–80 | |
| Polyethylene glycol (M.W.=600) monostearate. | 4 | 85–105 | Do. |
| Polyethylene glycol (M.W.=600) monooleate. | 4 | 91–114 | |
| Polyethylene glycol (M.W.=600) tristearate. | 4 | 82–109 | |
| Hexylene glycol + stearic acid (equal parts). | 4 | 84–107 | |
| Do | 10 | 66–87 | |

| Melting Point Depressant | Percent of Antioxidant | Melting Range, °C. | Remarks |
|---|---|---|---|
| Propylene glycol monooleate | 4 | 86–109 | |
| Paraffin + stearic acid (equal parts). | 10 | 76–88 | |
| Paraffin + polyethylene glycol (M.W.=600) (equal parts). | 10 | 75–96 | |

It will be noted that the melting point of the starting material was not lowered significantly by melting and casting it. Moreover, the cast product did not disperse into the rubber. On the other hand, from any of the foregoing melting point depressants satisfactory dispersing material can be produced, if a sufficient amount is used.

It is apparent from the examples given that many different components may be utilized in the process of this invention. Also, new polymers, esters, fatty acids and other chemical substances are constantly being developed and made commercially available, many of which undoubtedly will be found compatible and adaptable in the process. It is therefore not only impossible to catalog useful components but to attempt to describe the invention in its broader aspects in terms of chemical names of the components would be misleading. The invention lies in the physical effect produced in the antioxidant by the added component, the essential function of which is to depress the melting point. Those skilled in the art will readily know or deduce with confidence applicability of materials available to the purposes of the invention. In any case routine tests not of an inventive nature will provide reliable data. Many materials otherwise useful have no practical significance because of high cost. Some economically attractive materials are incompatible and yield no useful result. It is a safe assumption that no one will wish to make a useless composition or will be misled because it is possible to misapply the teachings of the present disclosure in order to do so.

It is intended to cover all changes and modifications of the examples of the invention herein chosen for purposes of disclosure which do not constitute departures from the spirit and scope of the invention.

What is claimed is:

1. The method which comprises mixing polymeric dihydro-2,2,4-trimethylquinoline with a compatible melting point depressant 15 percent of which lowers the point at which the polymer begins to soften to at least about 85° C., the amount of said melting point depressant being not more than 15 percent and insufficient to lower the initial softening point below 65° C. but sufficient to lower to at least about 85° C. the point at which the polymer begins to soften, heating the mixture to homogeneous molten liquid condition, cooling and subdividing the fused mixture into discrete free-flowing particles.

2. The method which comprises mixing polymeric dihydro-2,2,4-trimethylquinoline with a mixture of polyethylene glycol and stearic acid in amount not more than 15 percent insufficient to lower the initial softening point below 65° C. but sufficient to lower to at least about 85° C. the point at which the polymer begins to soften, heating the mixture to homogeneous molten liquid condition, cooling and subdividing the fused mixture into discrete free-flowing particles.

3. The method which comprises mixing polymeric dihydro-2,2,4-trimethylquinoline with fatty acid ester of polyhydric alcohol in amount not more than 15 percent insufficient to lower the initial softening point below 65° C. but sufficient to lower to at least about 85° C. the point at which the polymer begins to soften, heating the mixture to homogeneous molten liquid condition, cooling and subdividing the fused mixture into discrete free-flowing particles.

4. The method which comprises neutralizing with ammonia the aqueous acid reaction mass of acid polymerized dihydro-2,2,4-trimethylquinoline, extracting the polymer from the neutralized aqueous reaction mixture with an organic solvent boiling above the softening point of the polymer, removing solvent by distillation, maintaining the polymer in molten condition by heating and while it is still in molten condition, mixing with a compatible melting point depressant 15 percent of which lowers the point at which the polymer begins to soften to at least about 85° C., the amount of said melting point depressant being not more than 15 percent and insufficient to lower the initial softening point below 65° C. but sufficient to lower to at least about 85° C. the point at which the polymer begins to soften, stirring to obtain a homogeneous molten liquid, cooling and subdividing the fused mixture into discrete free-flowing particles.

5. The method which comprises mixing polymeric dihydro-2,2,4-trimethylquinoline with about 5 percent stearic acid, heating the mixture to homogeneous molten liquid condition, cooling and subdividing the fused mixture into discrete free-flowing particles.

6. The method which comprises mixing polymeric dihydro-2,2,4-trimethylquinoline with about 10 percent stearic acid, heating the mixture to homogeneous molten liquid condition, cooling and subdividing the fused mixture in flaked form.

References Cited in the file of this patent

UNITED STATES PATENTS

| 2,500,597 | Arnold et al. | Mar. 14, 1950 |
| 2,718,517 | Harris | Sept. 20, 1955 |